(12) United States Patent
Goerg et al.

(10) Patent No.: US 10,736,192 B2
(45) Date of Patent: Aug. 4, 2020

(54) CALIBRATION OF DRIVERS OF A LIGHT SOURCE

(71) Applicant: Rosco Laboratories Inc., Stamford, CT (US)

(72) Inventors: Nicolas Forsyth Goerg, Lyons (FR); Nils de Montgrand, Lyons (FR)

(73) Assignee: Rosco Laboratories Inc., Stamford, CT (US)

( * ) Notice: Subject to any disclaimer, the term of this patent is extended or adjusted under 35 U.S.C. 154(b) by 0 days.

(21) Appl. No.: 16/359,526

(22) Filed: Mar. 20, 2019

(65) Prior Publication Data

US 2019/0313502 A1  Oct. 10, 2019

Related U.S. Application Data

(60) Provisional application No. 62/653,832, filed on Apr. 6, 2018.

(51) Int. Cl.
*H05B 33/00* (2006.01)
*H05B 45/20* (2020.01)
(Continued)

(52) U.S. Cl.
CPC .............. *H05B 45/20* (2020.01); *G01J 3/505* (2013.01); *H05B 45/22* (2020.01); *H05B 47/19* (2020.01)

(58) Field of Classification Search
CPC ....... H03K 17/9622; H03K 2017/9706; H03K 17/945; H03K 2217/94068; H03K 3/033; H03K 17/9517; H03K 17/962; H03K 17/97; H03K 2217/94005; H03K 3/355; G02B 27/0172; G02B 2027/012; G02B 2027/0178; G02B 2005/1804; G02B 2027/0105; G02B 2027/0125; G02B 2027/0138; G02B 2027/0174; G02B 2027/0187; G02B 21/0064; G02B 21/0076; G02B 26/0858; G02B 26/10; G02B 26/121; G02B 27/0101; G02B 27/017; G02B 27/0922; G02B 27/0944; G02B 27/2207; G02B 27/2228; G02B 27/30; G02B 5/18; G02B 5/1809; G02B 5/1852; G02B 5/1857; G02B 5/22; G02B 6/0016; G02B 6/0038; G02B 6/005; G06F 19/00; G06F 19/3418; G06F 19/3468;
(Continued)

(56) References Cited

U.S. PATENT DOCUMENTS 6,528,954 B1   3/2003 Lys et al.
2017/0139442 A1*  5/2017 Yoshizumi .......... H04M 1/0268
(Continued)

OTHER PUBLICATIONS

European Invitation pursuant to Rule 62a(1) Application No. 19167677.4 Completed Date: Jun. 7, 2019 2 Pages.
(Continued)

*Primary Examiner* — Monica C King
(74) *Attorney, Agent, or Firm* — Whitmyer IP Group LLC (57) ABSTRACT

The present disclosure relates generally to techniques for adjusting a light source to provide radiant energy having a particular spectral characteristic, and more particularly, to a system and method of selectively controlling and calibrating LEDs within a light fixture to produce radiant energy so that the light fixture emits light at a desired color.

30 Claims, 9 Drawing Sheets

(51) Int. Cl.
 *G01J 3/50* (2006.01)
 *H05B 45/22* (2020.01)
 *H05B 47/19* (2020.01)

(58) Field of Classification Search
 CPC ...... G06F 16/245; G06F 16/248; G06F 17/11; G06F 1/163; G06F 21/32; G06F 2203/04108; G06F 3/014; G06F 3/015; G06F 3/017; G06F 3/0304; G06F 3/0412; G06F 3/044; G06F 3/0482; G06F 3/0484; G06F 3/0485; G06F 3/04886; G08G 1/04; G08G 1/166; G08G 1/0112; G08G 1/0129; G08G 1/0141; G08G 1/096725; G08G 1/09675; G08G 1/096775; H02J 50/10; H02J 50/20; H02J 50/40; H02J 50/80; H02J 50/90; H02J 7/025
 See application file for complete search history.

(56) References Cited

U.S. PATENT DOCUMENTS

2018/0011447 A1* 1/2018 Yoshizumi ............. G04B 47/00
2018/0116515 A1* 5/2018 Acharya ................ G01S 19/00

OTHER PUBLICATIONS

EP Partial Search Report Application No. 19167677 Completed: Aug. 23, 2019 10 Pages.

\* cited by examiner

CALIBRATION OF DRIVERS OF A LIGHT SOURCE

TECHNICAL FIELD

The present disclosure relates generally to techniques for adjusting a light source to provide radiant energy having a particular spectral characteristic, and more particularly, to a system and method of selectively controlling and calibrating LEDs within a light fixture to produce radiant energy so that the light fixture emits light at a desired color.

BACKGROUND

Recently there has been a trend in replacing conventional incandescent light bulbs with light emitting diodes (LEDs). LEDs are advantageous over conventional incandescent bulbs because they are more efficient in terms of energy use and longevity. Further, an increasing variety of lighting applications require precisely controlled spectral characteristics of the radiant energy (e.g., light).

However, the process of manufacturing light sources, such as LEDs, can be highly variable. LEDs are subject to manufacturing deviations, which result in each LED possessing slightly different light qualities despite originating from the same production run. LEDs designed to be of the same wavelength are often manufactured with slightly different wavelengths. This variability makes it difficult to achieve a desired spectral characteristic in a given environment (e.g., stage, broadcast studio, film set, photo shoot, architectural installations, retail displays, etc.), especially when multiple light fixtures having slightly different lighting qualities are being used. Further, there are many different manufacturers producing LEDs. Each manufacturer may have its own process and standards for constructing LEDs, which introduces additional variability. For example, a red LED made by a first manufacturer may have different lighting qualities compared to another red LED made by a second manufacturer. The variety in manufacturing processes and standards also makes it difficult for an end user using light fixtures from different manufacturers to achieve a desired spectral characteristic for a lighting application.

Some manufacturers even change the combination of LEDs that they use in their light fixtures, such that trying to reproduce the same, uniform color with multiple lighting fixtures can be a complex problem. For example, a first light fixture having a set of LEDs: x, y, z, may be driven by specific power components: a, b, c. A second light fixture having a set of LEDs: x', y', z', may emit light of a different color if driven by the same power components: a, b, c.

Conventional lighting fixtures are also limited with respect to certain colors and color properties due to each fixture having a limited number of LEDs (i.e. 3 LEDs for red, green, and blue). This means that the available spectrum of colors which a conventional light fixture is capable of producing is limited and discrete.

Conventional light fixtures with LEDs also have drawbacks related to color shifting when dimming. Changes in electrical current through an LED affect the junction temperature of the device, which can shift the spectral power distributions. The lower energy (e.g., voltage, current) driving the LED causes a different radiant energy to be produced, thus causing a change in the wavelength of the light being emitted. This ruins the purity of the color produced and does not allow for a proper fade out or fade in of the colored light.

Thus, there exists a need in the art for a system and method of controlling one or more light fixtures with LEDs which have the capacity to address the above problems by driving the light fixture to consistently and uniformly emit light at a desired color.

SUMMARY

The needs set forth herein as well as further and other needs and advantages are addressed by the present teachings, which illustrate solutions and advantages described below.

It is an object of the present teachings to remedy the above drawbacks and issues associated with prior art light fixtures and light fixture controllers.

It is another object of the present teachings to provide a system and method designed to have multiple lighting fixtures produce uniform colors of light.

It is another object of the present teachings to provide a system and method designed to allow a user to create or select a color locally and have a remote light fixture reproduce the color. It is a further object to allow a user to see a color created on a mobile device be emitted by or on a portable LED fixture. This allows a user to properly see how the color reflects off different objects, travels through different mediums, and/or looks at different levels of brightness.

The system according to the present teachings includes a controller which is connected to at least one light fixture having a memory chip. The memory chip contains data indicative of the LEDs on the light fixture. A processor inside the controller receives the LED data from the memory chip, along with color data indicative of the user selected color. The processor then determines the intensity of radiant energy each LED should emit, such that the combination of radiant energy from all the LEDs produce the user selected color. The user selected color can be depicted as a color coordinate in a coordinate space, for example, CIE 1931.

The light fixture comprises at least one arrangement of LED light sources. The LEDs may be arranged in a rectangular format, linear format, a honey comb shape, or in other configurations. One arrangement of the light fixture contains a Red LED, a Green LED, and a Blue LED. The Red LED produces radiant energy having a peak wavelength of 620 nm. The Green LED produces radiant energy having a peak wavelength of 521 nm. The Blue LED produces radiant energy having a peak wavelength of 456 nm. Each LED may or may not include a phosphor coating to help produce the desired color of light. The configuration of LEDs is designed to allow a variety of colors to be produced by mixing different intensities of light. By adjusting the intensities of each LED, different colors of mixed light can be created.

More LEDs can be added to provide more colors (e.g. wider spectrum, more continuous spectrum), increase white balance, hue or other properties of the light fixture. A white LED can be added with a color temperature of 4000K. The system may include a second Green LED producing radiant energy with a peak wavelength of 550 nm and/or an Amber LED producing radiant energy with a peak wavelength of 598 nm. Each LED may be within a small range around the preferred wavelength. For example, the Red LED may be between 610 and 680 nm, with or without phosphor coating; the first Green LED may be between 530 and 560 nm, with or without phosphor coating; the Blue LED may be between 430 and 470 nm, with or without phosphor coating; the Amber LED may be between 580 and 610 nm, with or without phosphor coating; the second Green LED may be between 510 and 540 nm, with or without phosphor coating; and the White LED may have a color temperature between 2700K to 6500K.

One light fixture may include six colored LEDs, e.g., Red, Green 1, Green 2, Blue, Amber, and White. The Green 1 LED is configured to have a longer wavelength than the Green 2 LED. Thus, the light from the Green 1 LED emits lime green visible light (530-560 nm) and the Green 2 LED emits classic green light (510-540 nm). The Red, Green 1, and Amber LEDs may or may not have a phosphor coating. This coating is optional and in different embodiments, none, some, or all of these LEDs have a phosphor coating.

Further, the system according to the present teachings may have two different techniques of powering the LEDs in order to prevent or at least reduce color shifts as one or more of the LEDs are dimmed or further illuminated. The typical method of dimming an LED involves merely reducing the power (e.g., voltage, current) sent to that LED. As the power gets lower, the radiant energy of the LED may decrease or increase causing a shift in the peak wavelength of the light. In order to avoid this problem, the system is configured so that when the LED is dim, it is driven with constant current and when the LED is bright, it is driven using pulse width modulation (PWM). Each LED may have a threshold value for defining when PWM should be used and when constant current should be used. For example, if the LEDs use a 0-255 scale for intensity, the threshold value may be at, for example, 50, 100, 150, or 200, wherein if the intensity is less than the threshold, constant current is used to drive the LED.

The system is designed to maximize color uniformity of the light emitted from the light fixtures, no matter which assortment of LEDs are implemented in each light fixture. Many different companies and designers choose different assortments of LEDs in their lighting fixtures, in order to design to certain needs. Some arrays may be cheaper, some may have better dimming qualities, and some may produce the widest variety of colors, in addition to other features. Further, the manufacturing process for LEDs often involve deviations, which results in color shifts and variations between LEDs designed to emit the same wavelength of light.

To address the problems associated with the variations in light color uniformity from one light fixture to another light fixture, a memory chip is installed in each lighting fixture, wherein the memory chip stores data on each LED and in particular, data on the radiant energy actually produced by the LED. The data may include information pertaining to manufacturing defects or deviations in the LED, causing slight differences in emitted color, even those made by the same manufacturer. The memory chip may also include data on the calibration of the LEDs in the respective light fixture. The memory chip may also include data on spectral power distribution, xy coordinates in different color spaces, or forward voltages of LEDs in the light fixture. The compensation calculated by the system may be referred to as calibration data. Calibration data may also include the deterioration of LEDs due to use or other imbalances/imperfections from LED to LED.

The memory chip is advantageous in eliminating or reducing the effects of imperfect manufacturing as it allows a control system, controller, or driver to properly compensate for LEDs that produce light of slightly different wavelengths from fixture to fixture. A controller, which is connected to the light fixture is configured to receive data from the memory chip. The controller may comprise a driver within the light fixture or an external driver. The controller comprises a processor which is configured to process the LED data from the memory chip through an algorithm to produce a desired color by the user. Since each light fixture may have LEDs producing different wavelengths of light, the controller's algorithm will determine appropriate intensities for each LED. Therefore, each light fixture will output the same colored light regardless of the manufacture.

The controller is configured to communicate with multiple light fixtures, either simultaneously or in sequence, wherein each light fixture has a memory chip containing LED data. Thus, the controller may control and calibrate a plurality of light fixtures so that each light fixture produces light having the same color, even if the light fixtures vary between one another with respect to their LEDs, the number of LEDs, and the type of LEDs.

The controller can receive the color creation or selection from the user in a variety of ways. In one method, the user can adjust the color using the controller's user interface, changing the properties of the light emitted by the fixture(s). The user interface may comprise push buttons and/or switches through which the user can manipulate the controller. The user interface may also comprise a graphical display for displaying various parameters and settings of the controller. In some instances, the graphical display is a touch screen where the user can provide inputs through gestures by touching the screen. Adjusting the color can be done while the light fixture is on, with real-time adjustment of the light, or done while the lighting fixture is off.

A user can also specify the desired color the lighting fixture(s) should emit using a mobile device. The mobile device allows the user to adjust different properties of the emitted light. Additionally, with the mobile device, the user can take a picture using a camera on the mobile device, choose a color within that picture, and transmit the chosen color to the controller. This process can work similarly to the eyedropper tool. When the chosen color is sent to the controller, the controller uses the color and LED data to determine driver signals for driving the light fixture(s) to produce a color which matches that of the chosen color. The mobile device may communicate with the controller via a Bluetooth connection or cellular connection. In addition, an application on the mobile device, or a separate website, will contain a variety of preset colors created by different users. A user could select one of these premade colors which can be sent to the controller. A mobile device can also communicate the color data with other mobile devices over the internet. Therefore, a color created can be sent to any other person having the app or access to the website which can store the color data, in addition to being sent directly to the light fixture's controller. Furthermore, the controller is also capable of communicating with other controllers. This network allows multiple controllers in the same lighting system to create the same color.

The color data may be sent as a color coordinate or color spectrum. A color coordinate may be a single wavelength of light or a beam having a specific color temperature. Commonly, color grids are composed of a spectrum of visible light along an x axis and a brightness factor along the y axis. RGB color mixers use a three-dimensional coordinate system where the axis are the intensities of the Red, Green, and Blue light. The color coordinate is the location of the color based on these axes. A color coordinate could be in reference to a system with any number of dimensions. In the present teachings, the color coordinate grid is characterized by six axes, each axis corresponding to an intensity of an LED having a specific color. In contrast, a color spectrum may be a collection of colored beams which mix together to form a single color. A color spectrum can be measured by a spectrometer, and the spectrometer can send this spectrum data to the controller or mobile device. Thus, the controller is capable of receiving color data in coordinate or spectrum format, and in succession producing that color on the light fixture.

The system may further comprise a mini-fixture also referred to as a swatch light. The mini-fixture functions similarly to the light fixture but is smaller and thus more portable. This allows the user to see the exact color being reproduced when he is positioned away from the light fixture(s). A mini-fixture contains the same LEDs as its corresponding larger light fixture(s) and can be driven using a controller, as discussed above, or an application. An application which controls the mini-fixture is preferably run on a mobile device, such as a cellphone, but could be run on any electronic device.

For precision, the mini-fixture has a memory chip containing the LED data about the mini-fixture's LEDs. Conventional ways of viewing the colors portably, such as a mobile phone, use LCD screens which are not completely accurate representations of the color, nor do they project light in the same way. A mini-fixture is thus advantageous over a mobile device because the LED system within the mini-fixture is the same as that in the larger light fixtures. The mini-fixture is also equipped with a diffusor, configured to blend the multiple LEDs into a single color of light. Further, the use of a mini-fixture allows one to see how the specific color will reflect off objects, for example, the human body. The mini-fixture is much more portable and is less expensive than a large lighting fixture. The mini-fixture's portability can also be increased by being battery operated, preventing the need for a nearby outlet or bulky power source. This allows people separated from each other to see the same color as it will be produced, in a more portable device. The mini-fixture may also be equipped with a magnet. The magnet provides, for example, the ability to mount and dismount the mini-fixture in a quick manner.

Other features and aspects of the invention will become apparent from the following detailed description, taken in conjunction with the accompanying drawings, which illustrate by way of example the features in accordance with embodiments of the invention. The summary is not intended to limit the scope of the invention, which is defined solely by the claims attached thereto.

DETAILED DESCRIPTION

Figure 1:
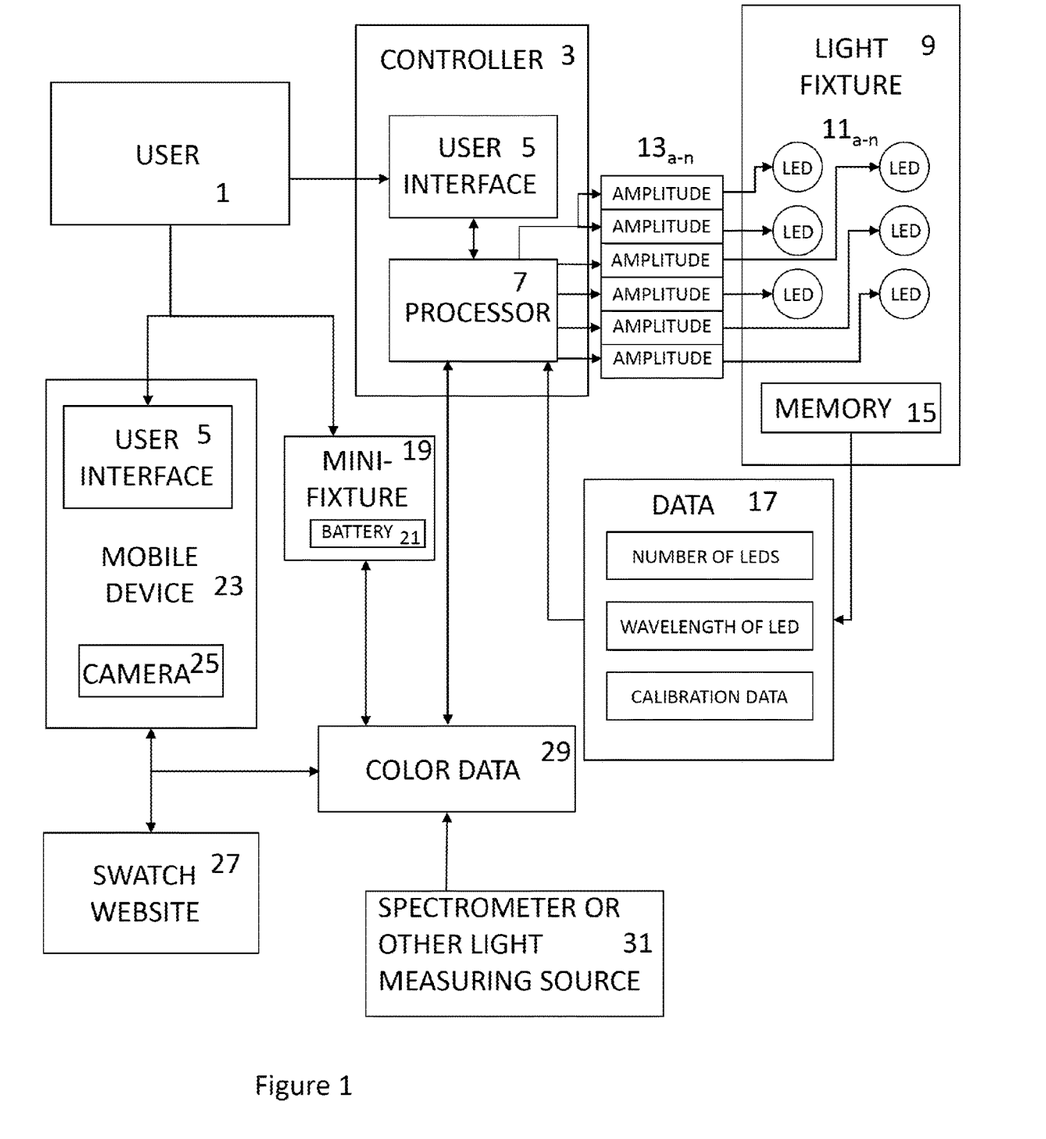
FIG. 1 is a schematic view of the lighting system according to the present teachings.

FIG. 1 depicts an exemplary embodiment of the system. The user 1 may interact with the user interface 5 on the controller, or the user interface 5 on a mobile device. The user may be a person selecting a color or may be an automated system that selects colors based on pre-set conditions or uses other variables to create a color. The user interfaces on the mobile device and controller may look and perform the same, however, may also be different interfaces.

User interface 5 contains a method for obtaining a color coordinate. User 1 may already know the color he wishes to have light fixture 9 emit, and can input that color directly to the user interface 5. User interface 5 may also have buttons that can modify the color's hue, saturation, brightness, intensity, tint, contrast, gamma, polarization, white balance, chroma, shade, and/or other color properties.

Figure 7:
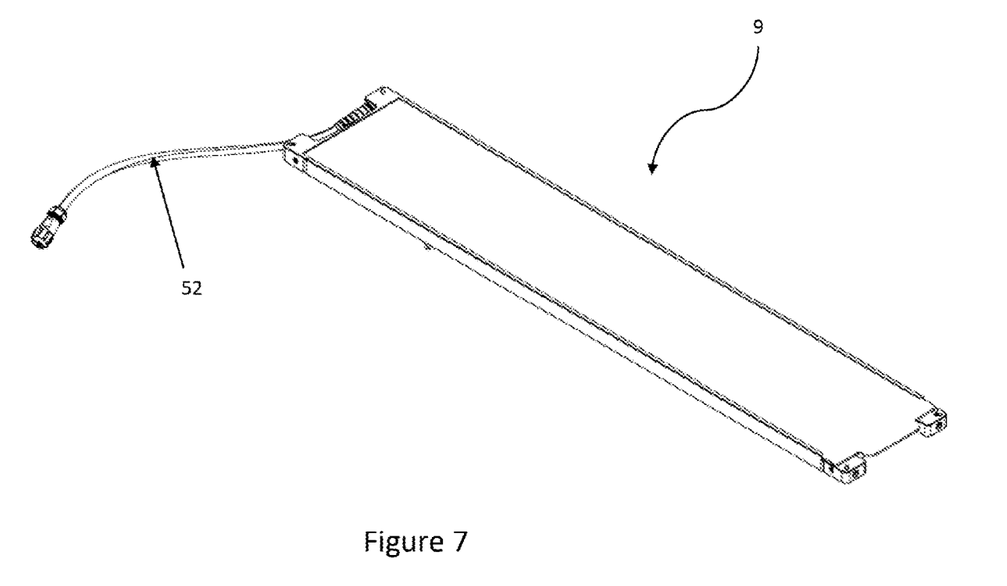
FIG. 7 is a view of the lighting fixture in the lighting system of FIG. 1.

The light fixture 9, shown in FIG. 7, contains an array of LED light sources 11$a$-11$n$ and a memory chip 15. Memory chip 15 contains data on the light sources 11$a$-11$n$. Memory chip 15 may store the actual wavelength of light emitted by each particular LED in the system. It may also contain calibration data of the lights, and how well the lights are currently functioning. Memory chip 15 may be programmed with LED data 17, for example, the spectral power distribution or forward voltage of each color of LED in the light fixture. The memory chip can also be updated with additional or current information regarding each LED. For example, the memory chip is configured to record the LED's performance during usage. Memory chip 15 could be connected to a wavemeter, which detects the wavelength of light from each LED accurately. Data 17 could be updated on the memory chip 15, either in real time or when a user selects to update the memory chip. Memory chip 15 may also contain data indicative of the peak wavelength of each LED at each discrete intensity emitted. This allows the processor 7 to better compensate for color shifting occurring as the LED is dimmed.

The data 17 is used by processor 7 within the controller 3 to determine the intensity or other characteristics of each LED 11$a$-11$n$ in lighting fixture 9. In order to communicate with lighting fixture 9, the controller 3 will send signals, each having their own amplitude 13$a$-13$n$ corresponding with LED 11$a$-11$n$. Processor 7 thus receives data 17 from the memory chip and color data 29 from a user. From the LED data 17, the processor creates a coordinate system where each LED color is an axis. If, for example, there are six different color LEDs in the lighting fixture, this coordinate space will be six-dimensional. When the color data 29 is received, the processor determines where in the six-dimensional space the color is located, thus determining the intensity of each LED. In turn, when all the lighting fixture's LEDs are mixed, the desired colored light from the fixture is created. If the color data 29 is a color spectrum, processor 7 can similarly convert the spectrum data into a color coordinate and in succession find the coordinate in the lighting fixture' six-dimensional space.

The amplitudes 13$a$-13$n$ may directly control their corresponding LEDs 11$a$-11$n$. However, the processor 7 may also send the amplitudes 13$a$-13$n$ to the light fixture 9 which in turn control the LEDs 11$a$-11$n$. The controller 3 drives the LEDs through two different types of signals based on the desired brightness of each LED 11. If the LED is desired to be bright, the controller 3 drives the LED using a PWM (pulse width modulation) signal, and if the LED is desired to be dim, the controller 3 will drive the LED using a constant current signal. Each LED may have a threshold value for defining when PWM should be used and when constant current should be used. The threshold intensity to determine which method of driving the LED may be a preset value based on the LED's color or manufacture, but also may be an adjustable value based on the age of the LED or other variable affecting the LED's output. For example, if the LEDs use a 0-255 scale for intensity, the threshold value may be at, for example, 50, 100, 150, or 200, wherein if the intensity is less than the threshold, constant current is used to drive the LED.

The user 1 may use user interface 5 located on a mobile device 23 to select a color. The user interface 5 will allow the user 1 to change the color's saturation, brightness, wavelength, or other properties. The user interface 5 may have a color wheel or grid in order to allow user 1 to select the color they want. When user 1 has selected a color through user interface 5, the mobile device is capable of determining that color's coordinate or spectrum data 29. Another method of obtaining color data 29 is to use the mobile device's camera 25. The camera 25 can take a picture, and the user can select a color from that picture. The application on mobile device 23 can then find the color data 29 for the user selected color. In some cases, the exact color taken from the picture will not be what user 1 would like light fixture 9 to emit. Therefore, the user 1 can view the color taken from camera 25 and adjust the color via mobile device 23, controller 3 or a mini-fixture 19 (detailed below). In this way, the user can easily obtain the precise color he wants.

A color selected on mobile device 23 can be transmitted through a wireless or wired connection to controller 3. For example, the mobile device transmits the color data to the controller via a Bluetooth signal. Controller 3 may have an antenna for sending and receiving color data or other signals. For example, the controller may utilize a radio or cellular signal.

The selected or created colors can be shared across the internet from mobile device 23 to any other mobile device that can connect to the internet. The colors could be shared via a swatch website 27, or simply over email. In another embodiment, the colors are shared though the application on mobile device 23.

Colors can also be obtained from a spectrometer or other light measuring source 31. The measuring device 31 is configured to capture light and produce color data of the captured light. Specifically, when light is shown onto spectrometer 31, the light is analyzed, and the spectrum is recorded as color spectrum 29. This color spectrum can be sent to mobile device 23 or controller 3 to be saved, adjusted, and used to control one or more light fixtures.

Figure 8:
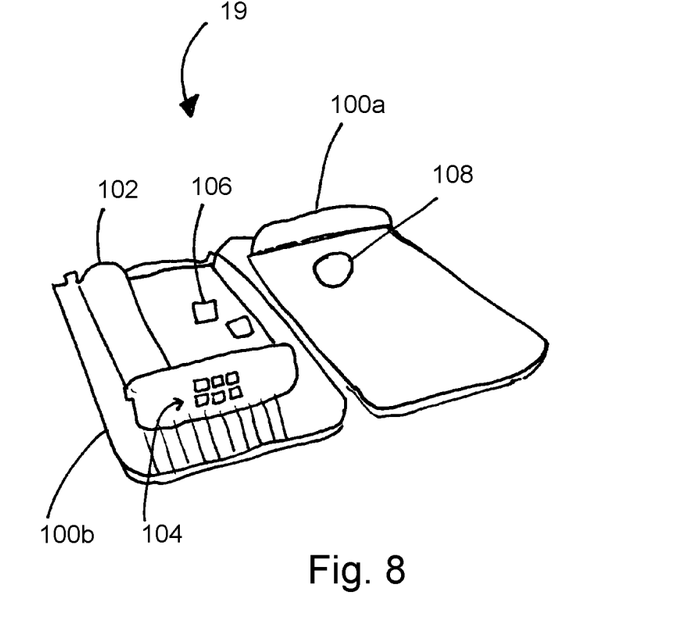
FIG. 8 is a perspective view of a mini-fixture with a detached top.
Figure 9:
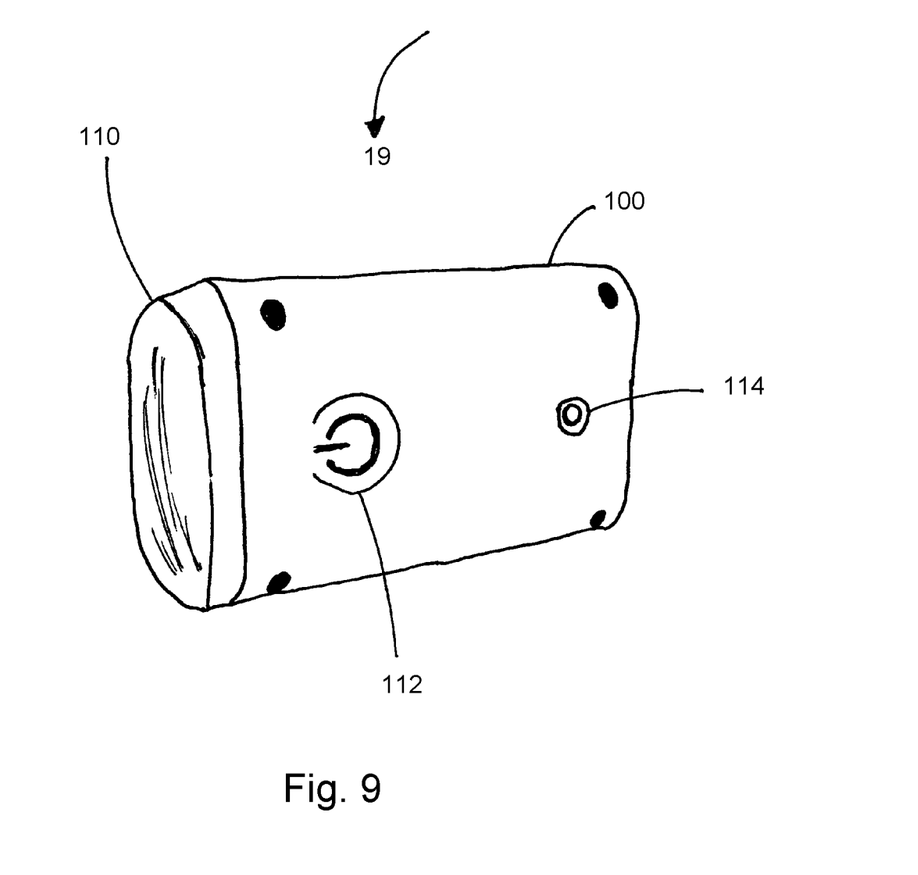
FIG. 9 is an isometric view of a mini-fixture.

Additionally, the system may include a mini-fixture 19 (FIGS. 8 and 9). The mini-fixture contains the same arrangement of color LEDs as light fixture 9, but, is smaller and thus has less total arrangements. The mini-fixture 19 has a few advantages over the light fixture 9. The mini-fixture can be cheaper to produce as it requires less LEDs and thus less parts and materials. Mini-fixture 19 is also portable and can be transported and still function even if away from a stage or other place containing large light fixtures. In one embodiment, the mini-fixture is powered by a battery 21. This will further increase its portability. Mini-fixture 19 is optionally powered using a portable rechargeable battery which allows the mini-fixture 19 to be moved throughout a set without the hassle of needing a near-by power source. Mini-fixture 19 may also contain an internal magnet configured to allow the mini-fixture 19 to be attached and detached from a mounting surface with relative ease.

Mini-fixture 19 may also have a controller 3 connected to a memory chip 15 in mini-fixture 19. It is also possible to have a dedicated driver for mini-fixture 19 which has data 17 indicative of the LEDs on mini-fixture 19 embedded into its algorithm. This would eliminate the need for a memory chip on the mini-fixture. If mini-fixture 19 requires a non-dedicated controller 3 to function, mini-fixture 19 would have a memory chip containing data 17 indicative of the LEDs on mini-fixture 19. An optional cable 52 may be attached to the mini-fixture 19 which can connect with the controller 3. Optional cable 52 can be connected to the memory chip 15 and transmit the LED data 17 from mini-fixture 19 to controller 3.

Figure 2:
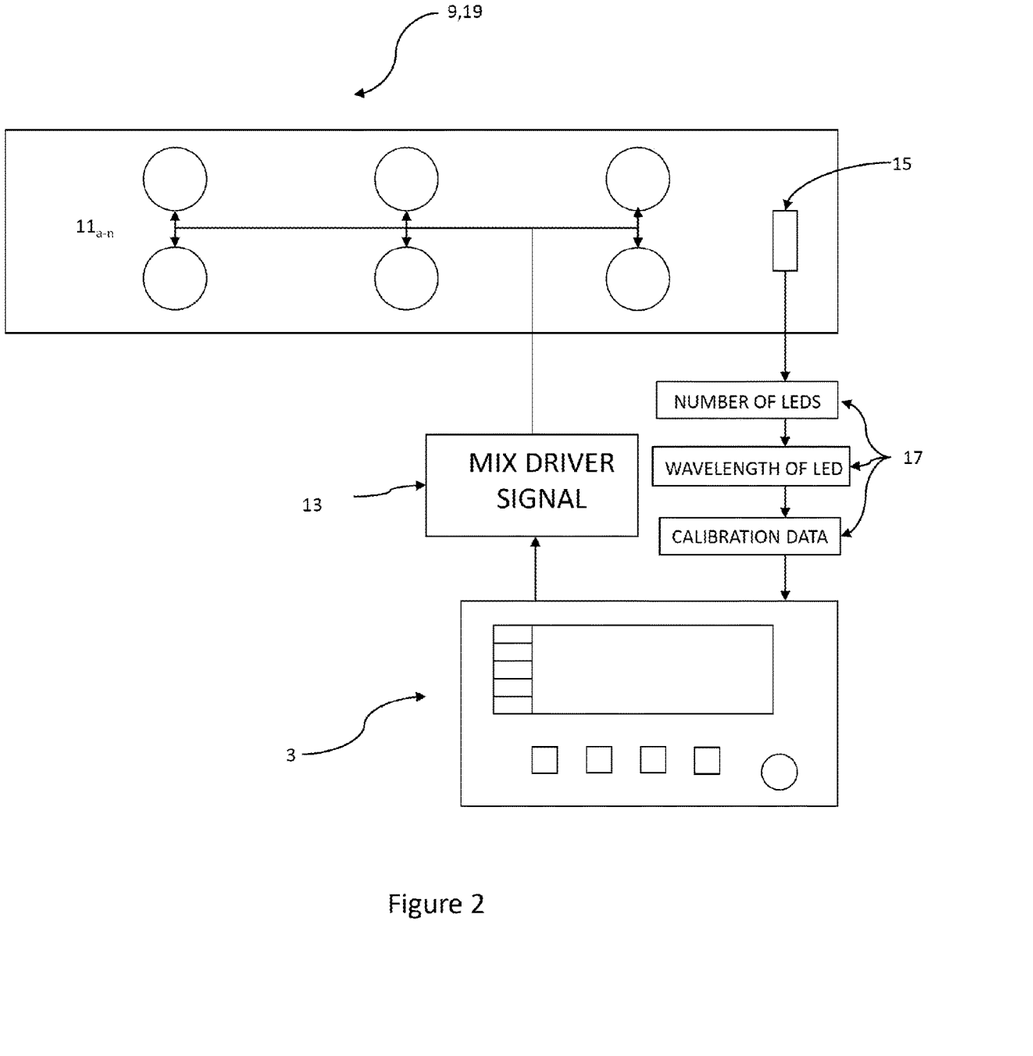
FIG. 2 is a detailed view of the controller connected to a light fixture in the lighting system of FIG. 1.

FIG. 2 shows a controller 3 communicating with a light fixture 9. Light fixture 9 can be replaced with mini-fixture 19 without changing the system. The light fixture 9 has a memory chip 15 which sends the data 17 to the controller 3. The controller 3 uses data 17 to determine the brightness of each LED 11*a*-11*n* required to produce the desired color from the user 1. Controller 3 communicates each amplitude 13 to the light fixture 9 via a mix driver signal. The mix driver signal may comprise a plurality of signals in the form of a multiplex signal. Controller 3 could also communicate with light fixture 9 using a variety of transmission lines, for example, XLR cables, coaxial cables, Ethernet cables, USB, etc.

Figure 3:
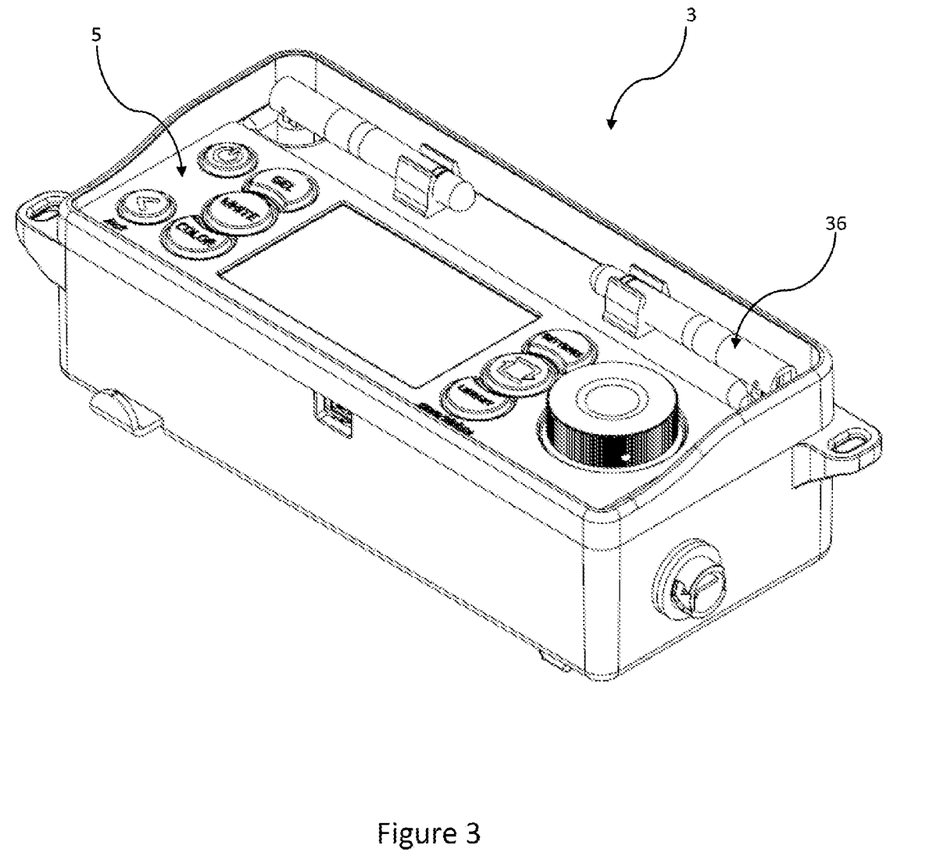
FIG. 3 is a view of the controller in the lighting system of FIG. 1.

FIG. 3 shows an example of controller 3. Controller 3 may comprise antennae 36. Antennae 36 could be used to communicate via Bluetooth, Wi-Fi, or other wireless transmissions. Controller 3 may optionally have only a single antenna. FIG. 3 also portrays a user interface 5 for the controller. User interface 5 has a display screen, power buttons, a dial, and various menu buttons to allow a user 1 to simply navigate and modify a color received or created.

Figure 4:
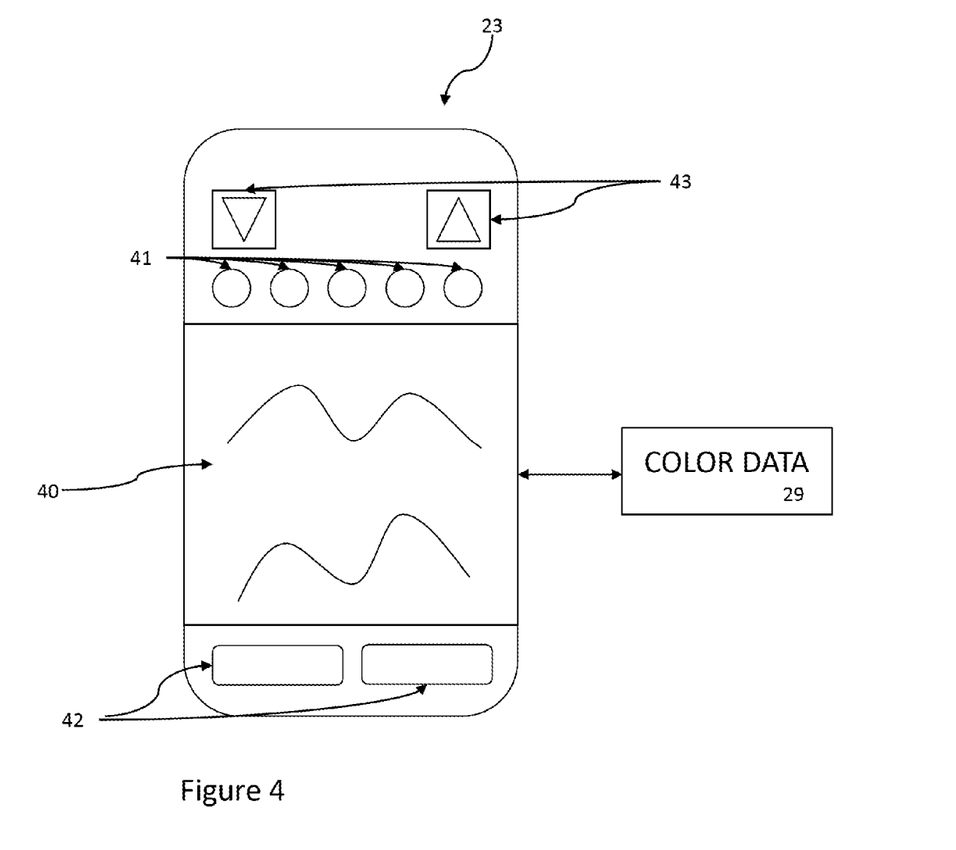
FIG. 4 is view of a mobile device connected to the controller in the lighting system of FIG. 1.

FIG. 4 shows a sample view of the user interface 5 on a mobile device 23. The center screen 40 may contain a color, color wheel, color grid, or other interface to select or modify a color. In this example of user interface 5, color property buttons 41 allow user 1 to select which property of the color they would like to modify. Using control buttons 43, the user 1 can change the selected color property. For example, if the user 1 selected color property button 41 associated with the saturation, control buttons 43 could add or subtract from the saturation of the color selected on the color grid displayed on color screen 40. Acceptance buttons 42 would allow the user 1 to either confirm the changes or deny the changes and revert back to the old color. In some embodiments, color data 29 contains information on various color properties such as hue and saturation. In other embodiments, color data 29 may comprise a color coordinate or color spectrum related to a color displayed on the color screen 40, and the user 1 can select the color's other properties.

Figure 5:
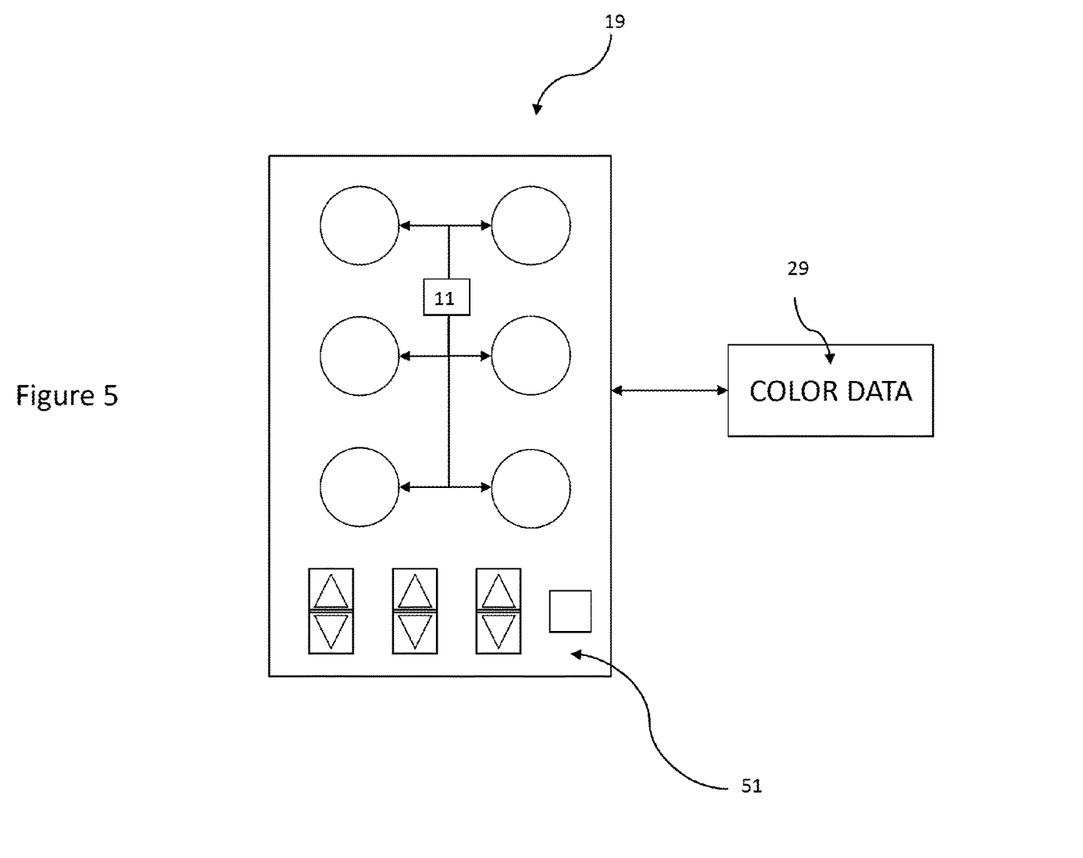
FIG. 5 is a view of a mini-fixture connected to the controller in the lighting system of FIG. 1.

FIG. 5 shows an example of Mini-Fixture 19. FIG. 5 shows controls built into mini-fixture 19. Mini-fixture 19 may have no controls and instead be required to connect with controller 3 to be controlled. Mini-Fixture 19 is capable of sending and receiving color data 29 to and from other devices in the network. Color data 29 may be sent via a Bluetooth connection or over the internet. A screen, which is depicted in FIG. 7 covers the LEDs in order to help the eye blend the colors from LEDs 11 into a single color. This screen could be a holographic diffusor common in the art, or other color mixing device to prevent color spots or fringes.

Figure 6:
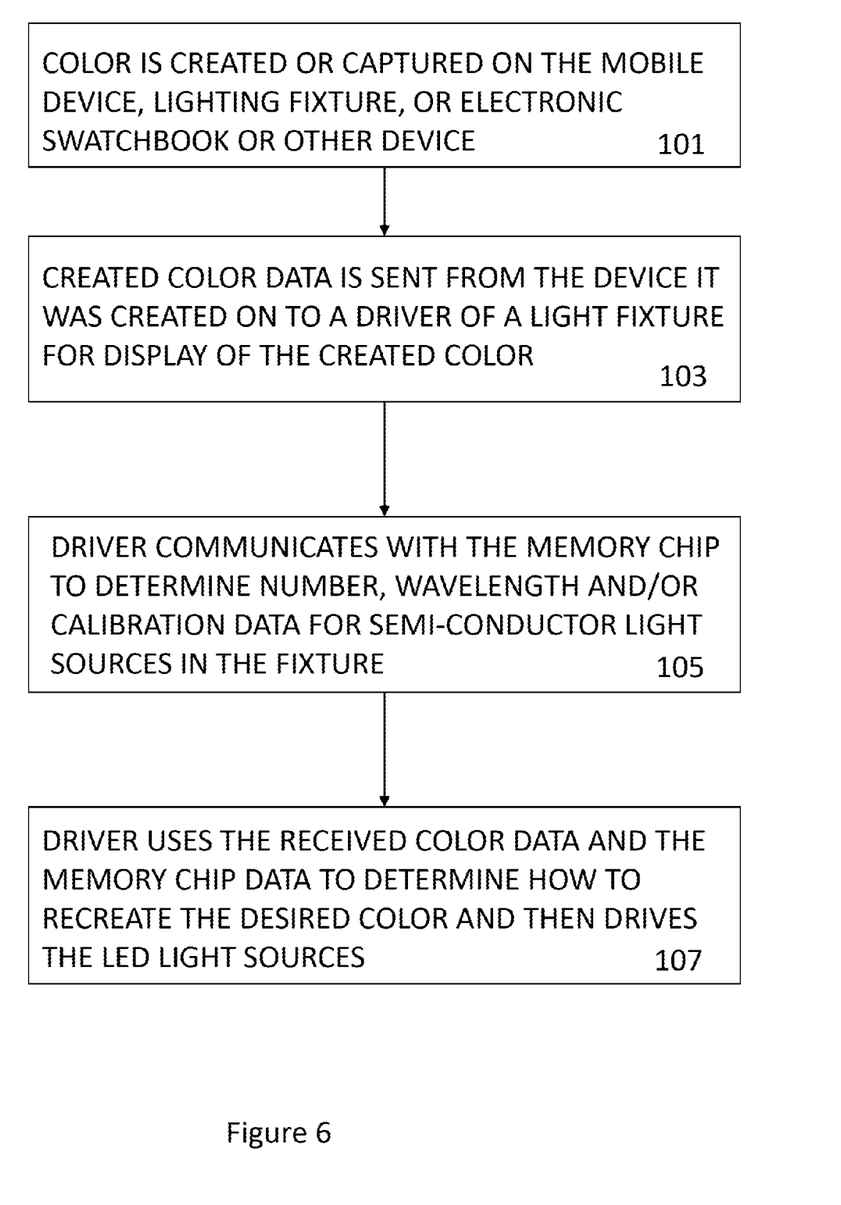
FIG. 6 is a flowchart of created or selected color data.

FIG. 6 shows a flowchart portraying one embodiment of how a color is designed and then reproduced. First, the color is created via a user 1 using a user interface 5 or via a spectrometer or other light measuring source 31. Next, the color is transmitted to controller 3 which controls a light fixture 9 or a mini-fixture 19. The controller 3 then communicates with the memory chip 15 of light fixture 9 or mini-fixture 19 to determine the number of LEDs in the fixture and the wavelength emitted by those LEDs. Processor 7 receives the data 17 from the memory chip 15 and uses an algorithm to determine an amplitudes 13a-13n to be sent to each LED 11a-11n in light fixture 9 or mini-fixture 19.

FIG. 8 shows a possible configuration of mini-fixture 19. A top side of the case 100a fits over the bottom side of the case 100b. The battery 102 can power the entire device. The battery 102 may be rechargeable or replaceable. The LED array 104 contains a plurality of LEDs 11a-11n having multiple colors. Driver 106 is electronically connected to the LED array 104 and is configured to control each individual LED 11x. The driver 106 may also have a wireless connection to an electronic device in order to receive controlling signals. Magnet 108 is located within case 100 or on case 100.

FIG. 9 shows an isometric view of a mini-fixture 19. A light diffusor or filter 110 is attached to the front end, over the LED array 104. The light diffusor or filter 110 blends the light from the multiple LEDs 11a-11n, thus creating a blended beam of colored light. The case 100 can protect the insides of mini-fixture 19 and can provide shape to the mini-fixture 19. The case may comprise an external power button 112, or other buttons capable of performing different functions, for example, changing the brightness of the light. A mount 114 is on the mini-fixture 19 which is capable of attaching the mini-fixture to various things. The mount 114 could be a magnet, female screw, carabiner, or other functionally designed mounting device.

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. An LED light color selection system comprising:
   a light fixture comprising at least three LEDs;
   an input signal which allows a processor to determine an intensity of each LED, specific to the light fixture, based on a color coordinate;
   a controller for generating signals indicative of the intensity of each LED to create a light indicative of the color coordinate;
   a transmitter for wirelessly transmitting the color coordinate.

2. The system of claim 1 wherein the color coordinate is wirelessly transmitted via Bluetooth.

3. The system of claim 1 wherein the transmitter is a mobile device; and
wherein the color coordinate is received by the mobile device.

4. The system of claim 1 wherein said transmitter is a mobile device; and
wherein the color coordinate is sent by the mobile device.

5. The system of claim 1 further comprising:
   a first LED emitting red visible light having a peak wavelength between 610 nm 680 nm;
   a second LED emitting blue visible light having a peak wavelength between 430 nm 470 nm; and
   a third LED emitting green visible light having a peak wavelength between 510 nm 540 nm.

6. They system of claim 5 further comprising:
   a fourth LED emitting white visible light having a color temperature between 2700K-6500K;
   a fifth LED emitting amber visible light having a peak wavelength between 580 nm 610 nm; and
   a sixth LED emitting green visible light having a peak wavelength between 530 nm-560 nm.

7. The system of claim 1, further comprising a swatch light which contains exactly one of each color LED in the light fixture
   wherein the light fixture has an array of at least 2 of each color LED.

8. A controller for an LED light fixture comprising:
   circuitry for generating at least two signals having different amplitudes for controlling different LEDs;
   an input signal representing the number of and peak wavelengths of LEDs in the light fixture;
   a processor for receiving said input signal and for controlling said circuitry to mix visible light from the LEDs.

9. The controller of claim 8 wherein a color coordinate is received by said processor and used to generate the at least two different amplitude signals.

10. The controller of claim 9 wherein the color coordinate is received wirelessly.

11. The controller of claim 10 wherein the color coordinate is selected from a swatch fixture.

12. The controller of claim 10 wherein the color coordinate is selected from a website.

13. The controller of claim 8 wherein the input signals are received from a light fixture.

14. An LED light fixture comprising:
    three different color LEDs,
    a controller which generates signals indicative of an intensity at which to drive each of the at least three LEDs, wherein each of the LEDs can be driven by constant current and pulse width modification.

15. The LED light fixture of claim 14, wherein a threshold intensity exists such that when the intensity of the LED is below the threshold intensity the LED is driven by a constant current and when the intensity of the LED is above the threshold intensity the LED is driven by pulse width modification.

16. The LED light fixture of claim 15, wherein each different color LED has an individual intensity threshold.

17. The LED light fixture of claim 16, further comprising a memory chip which stores data indicative of the peak wavelength and the individual threshold intensity of each color LED.

18. The LED light fixture of claim 17, wherein the controller generates driving signals for the LEDs.

19. The light source of claim 14 further comprising;
    a first LED emits white visible light at a temperature of about 4000 Kelvin;
    a second LED emits red visible light having a peak wavelength of about 620 nm;
    a third LED emits green light having a peak wavelength of about 550 nm; and
    the light source is controlled via a controller which generates separate signals of independent amplitude for powering each of the first, second, and third LEDs.

20. The light source of claim 19 wherein:
    a fourth LED emitting green light at a different peak wavelength from the third LED;
    a fifth LED emitting blue visible light;
    a sixth LED emitting amber visible light; and a controller for generating separate signals of independent amplitude for powering each of the fourth, fifth, and sixth LEDs.

21. The light source of claim 14 including:
a memory chip including data indicative of the number of LEDs in the light source.

22. The light source of claim 21 wherein:
the memory chip includes data indicating the spectral power distribution or forward voltage of each LED in the light source.

23. The light source of claim 21 wherein:
the memory chip includes data indicative of calibration data of one or more LEDs in the light source.

24. The light source of claim 21 wherein the memory chip includes data indicating the xy coordinates in different color spaces of each LED in the light source.

25. The light source of claim 18 further comprising:
a controller configured to receive the data from the memory chip.

26. A light source comprising:
a first LED emitting blue visible light with a peak wavelength of 430 nm-470 nm;
a second LED emitting red visible light a peak wavelength of 610 nm-680 nm;
a third LED emitting green light with a peak wavelength of 510 nm-540 nm; and
a fourth LED emitting green visible light with a wavelength of 530 nm-560 nm; and
a fifth LED emitting white visible light at a color temperature of 2700K-6500K; and
a sixth LED emitting amber visible light with a wavelength of 580 nm-610 nm; and
a controller for generating separate signals of independent amplitude for powering each of the first, second, and third LEDs.

27. The light source of claim 21 further comprising:
a case enclosing the LEDs and memory chip; and
a magnet within the case configured to allow the light source to be mounted onto a fixture.

28. The LED light color selection system of claim 1 wherein the light fixture is a first light fixture and the LED light color selection system further comprises a second light fixture;
wherein the first light fixture has a first blue LED, a first green LED, and a first red LED;
wherein the second fixture has a second blue LED, a second green LED, and a second red LED;
wherein the controller generates signals indicative of different amplitudes for the LEDs of the first light fixture and the LEDs of the second light fixture to produce light representative of the color coordinate.

29. The LED light color selection system of claim 28 wherein the blue, red, and green LEDs of the first light fixture and the blue, red, and green LEDs of the second light fixture respectively have different peak wavelengths.

30. The LED light color selection system of claim 28 further comprising a first memory chip in the first light fixture and a second memory chip in the second light fixture wherein the first memory chip has data indicative of the peak wavelength of the first blue, red, and green LEDs and the second memory chip has data indicative of the peak wavelength of the second blue, red, and green LEDs.

* * * * *